United States Patent
Yoon et al.

(10) Patent No.: US 9,145,122 B2
(45) Date of Patent: Sep. 29, 2015

(54) CONTROL METHOD FOR VEHICLE WITH DCT

(71) Applicant: Hyundai Motor Company, Seoul (KR)

(72) Inventors: Young Min Yoon, Seoul (KR); Seong Hwan Cheong, Hwaseong-si (KR); Ho Young Lee, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 275 days.

(21) Appl. No.: 13/869,314

(22) Filed: Apr. 24, 2013

(65) Prior Publication Data

US 2014/0162846 A1 Jun. 12, 2014

(30) Foreign Application Priority Data

Dec. 6, 2012 (KR) .................. 10-2012-0141409

(51) Int. Cl.
*B60W 10/02* (2006.01)
*B60W 10/06* (2006.01)

(52) U.S. Cl.
CPC ............... *B60W 10/02* (2013.01); *B60W 10/06* (2013.01); *Y10T 477/753* (2015.01); *Y10T 477/755* (2015.01)

(58) Field of Classification Search
CPC .. B60W 10/02; B60W 10/06; Y10T 477/753; Y10T 477/755
See application file for complete search history.

(56) References Cited

U.S. PATENT DOCUMENTS

| | | | |
|---|---|---|---|
| 2003/0224902 A1* | 12/2003 | Kahlon et al. | 477/3 |
| 2011/0136623 A1* | 6/2011 | Bosnjak | 477/174 |
| 2011/0185847 A1* | 8/2011 | Tanba et al. | 74/661 |
| 2011/0245036 A1* | 10/2011 | Lochocki et al. | 477/167 |
| 2013/0035201 A1* | 2/2013 | Falkenstein | 477/5 |

FOREIGN PATENT DOCUMENTS

| | | |
|---|---|---|
| JP | 2012031892 A | 2/2012 |
| JP | 2012097790 A | 5/2012 |
| KR | 10-2005-0058701 A | 6/2005 |
| KR | 10-2009-0024914 A | 3/2009 |
| KR | 10-2012-0000951 A | 1/2012 |

OTHER PUBLICATIONS

Korean Office Action issued in Korean Application No. 10-2012-0141409 dated Mar. 23, 2014.

* cited by examiner

*Primary Examiner* — Justin Holmes
(74) *Attorney, Agent, or Firm* — McDermott Will & Emery LLP

(57) ABSTRACT

A clutch in a vehicle with DCT having an ISG function is controlled for an engine speed to be decreased rapidly when the engine enters into the ISG so that a ring gear of an engine and a gear of a starter motor are meshed more rapidly when a vehicle restarts, to thereby prevent a response delay when restarting the vehicle.

2 Claims, 3 Drawing Sheets

CONTROL METHOD FOR VEHICLE WITH DCT

CROSS-REFERENCE TO RELATED APPLICATION

This application claims under 35 U.S.C. §119(a) the benefit of Korean Patent Application No. 10-2012-014109 filed on Dec. 6, 2012, the entire contents of which are incorporated herein by reference.

BACKGROUND (a) Technical Field

The present disclosure relates to a control method for a vehicle with a DCT (Dual Clutch Transmission), and more particularly, to a control method for a vehicle with a DCT capable of controlling a clutch of the DCT when an ISG (Idle Stop & Go) function is implemented by the vehicle mounted with the DCT.

(b) Background Art

Recently, a DCT with good fuel efficiency has gained popularity and further trials for maximizing the fuel efficiency have actively been made by adding an ISG function as another operation for improving fuel efficiency.

Since the DCT does not use a torque converter used as an accelerator in an AT (Automatic Transmission), the DCT accelerates with a slip control of the clutch and thus a vibration property is not good when a vehicle starts.

Recently, as a transmission to be mounted on environmental-friendly vehicles, a DCT (Dual Clutch Transmission) is spotlighted, and as another item to improve fuel efficiency, many efforts are directed to maximizing fuel efficiency of a vehicle by adding the ISG (Idle Stop & Go) function.

The DCT has a defect in that a vehicle is accelerated by slip control of a clutch and thus vibration characteristics when starting the vehicle are poor, because it does not use a torque converter used as an accelerator in an AT (Automatic Transmission).

In order to overcome the defect, a DMF (Dual Mass Flywheel) is disposed between an engine and a transmission to be able to reduce a change in torque and dampen vibration. Further, in the ISG, in a technology for preventing unnecessary fuel consumption due to idling of an engine by making the engine automatically stop when a vehicle is stopped, it is an important technological subject to improve a shock in a vehicle when an engine stops, and the start speed when the engine is restarted.

In the combination of the DCT and the ISG, there is a need for a control technology which reduces a shock in a vehicle and quickly stops the engine when the engine stops with an entry into the ISG, because there is no torque converter between the engine and the transmission, unlike the AT.

In particular, because the DCT is equipped with a DMF, it has a problem in that the engine does not quickly stop, even though fuel supply is stopped to stop the engine.

That is, as shown in FIG. 1, the engine speed is slowly reduced by an influence of the DMF when an engine stops for the ISG in the DCT, and the slow reduction of the engine speed may be a little advantageous in terms of reducing vibration or a shock in a vehicle; however, a driver has to wait for the engine to completely stop for engagement of a ring gear of the engine and a gear of a starter motor, in order to restart the engine for starting the vehicle. Therefore, there is a problem in that a restart of the vehicle is delayed.

The description provided above as related art of the present disclosure is intended only to help understand the background of the present disclosure and should not be construed as being known by those having ordinary skill in the art.

SUMMARY OF THE DISCLOSURE

One object of the present disclosure relates to providing a control method for a vehicle with a DCT, through which a clutch in a vehicle with DCT having an ISG function can be controlled for enabling an engine speed to be decreased relatively rapidly when the engine enters into the ISG. Accordingly, a ring gear of an engine and a gear of a starter motor can be meshed more rapidly when a vehicle restarts to thereby prevent a response delay when restarting the vehicle.

In order to achieve the above and other objects, a control method for a vehicle with a DCT may include a load applying step of temporally applying load to an engine before the engine completely stops, from a time point at which the engine begins to stop when a vehicle enters into the ISG.

BRIEF DESCRIPTION OF THE DRAWINGS

The above and other features of the present disclosure will now be described in detail with reference to certain exemplary embodiments thereof illustrated in the accompanying drawings which are provided hereinbelow by way of illustration only, and thus are not limitative of the present disclosure, wherein.

It should be understood that the appended drawings are not necessarily to scale, presenting a somewhat simplified representation of various preferred features illustrative of the basic principles of the disclosure. The specific design features described herein, including, for example, specific dimensions, orientations, locations, and shapes, are simply non-limiting examples, and actual design features will be determined in part by the particular intended application and use environment.

Reference numbers refer to the same or equivalent parts of the present disclosure throughout the several figures.

DETAILED DESCRIPTION

Hereinafter reference will be made in detail to various exemplary embodiments of the present disclosure, examples of which are illustrated in the accompanying drawings and described below.

Figure 1:
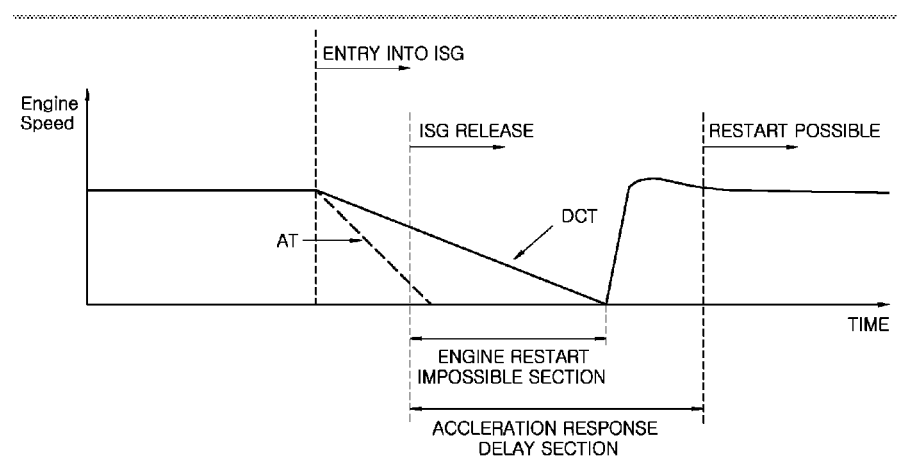
FIG. 1 is a graph showing problems caused in related art.
Figure 2:
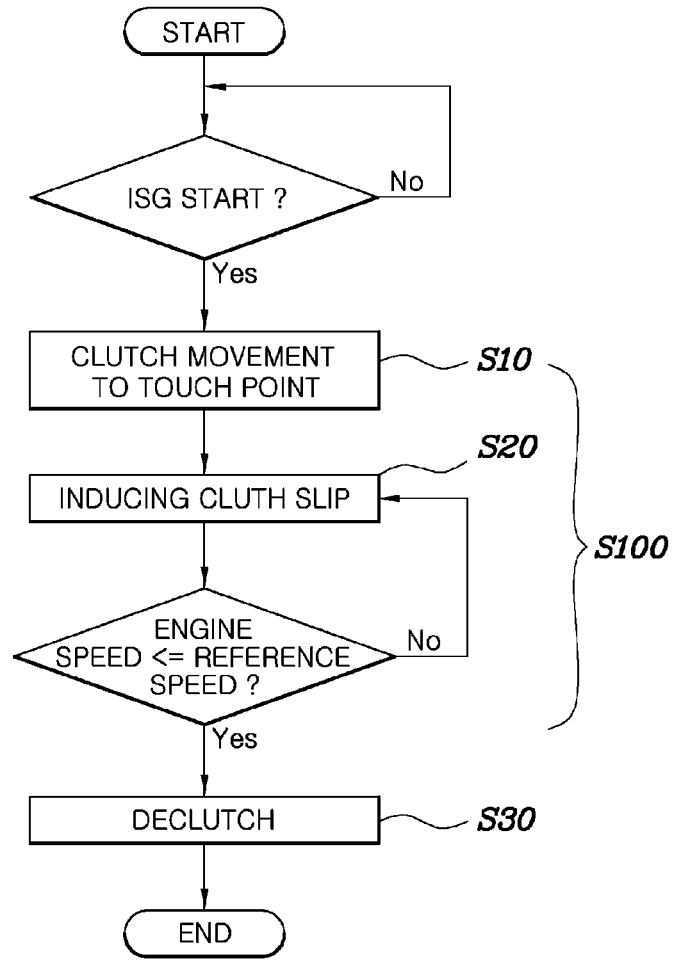
FIG. 2 is a flowchart showing a control method for a vehicle with a DCT according to an exemplary embodiment of the present disclosure.
Figure 3:
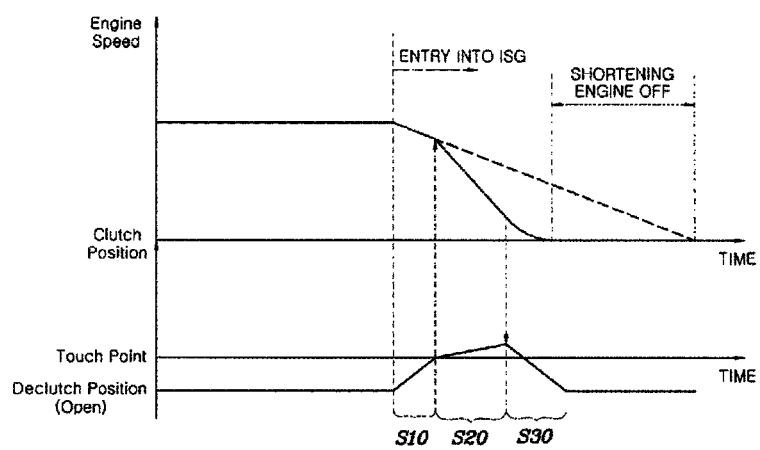
FIG. 3 is a graph showing a control method for a vehicle with a DCT according to an exemplary embodiment of the present disclosure.

Referring to FIGS. 2 and 3, the control method for a vehicle with a DCT according to an exemplary embodiment of the present disclosure may include a load applying step of temporally applying load to an engine before the engine completely stops, from a time point at which the engine begins to stop when a vehicle enters into the ISG S100.

That is, when the ISG function starts such that a vehicle begins to stop an engine, the load is applied to stop the engine more accurately in the load applying step S100 so that the ring gear of the engine and the gear of a starter motor can be meshed more promptly to prevent a restart response delay of a vehicle.

In the present embodiment, the load may be applied to an engine by slipping a clutch of the DCT in the load applying step S100.

For example, it may be possible to operate a compressor of an air conditioner for applying load to an engine, but in the present exemplary embodiment, the load may be applied to an engine by slipping a clutch of the DCT such that the load from a driving wheel that is stopped is applied to the engine to more promptly stop the engine.

Meanwhile, the load applying step S100 may include: a clutch approach step S10 of moving a clutch to a touch point where power of the clutch can start being transmitted at a time point at which the engine begins to stop; and after the clutch approach step S10, a slip generation step S20 of further progressing the clutch to generate a slip of the clutch. The control method may further include a declutch step S30 of disengaging the clutch when the engine speed becomes a predetermined reference speed or less (e.g., indicating the speed immediately before the engine almost stops).

That is, when the engine begins to stop by the ISG function, the clutch approaching step S10 is performed and then the slip generation step S20 is performed to more promptly decrease the engine speed, and the declutch step 30 is performed when the engine speed is at the reference speed or less indicating the engine will stop relatively soon. According to such a method, the engine may be controlled to stop gradually and not generate impact.

In the slip generation step S20, the clutch is operated linearly in an access direction toward the touch point; and in the declutch step S30, the clutch is operated gradually in a disengagement direction, so that a slope representing a decrease of the engine speed can be gradual to reduce vehicle impact.

Accordingly, the reference speed may be, e.g., a value indicating that the engine will stop relatively soon and that the clutch will be disengaged gradually to reduce the vehicle impact The reference speed can be a predetermined value which is decided in advance from experiment or analysis.

According to the present disclosure, a clutch in a vehicle with DCT having ISG function is controlled for an engine speed to be decreased relatively rapidly when the engine enters into the ISG so that a ring gear of an engine and a gear of a starter motor can be meshed more rapidly when a vehicle restarts, to thereby prevent a response delay when restarting the vehicle.

The present disclosure has been described in detail with reference to preferred embodiments thereof. However, it will be appreciated by those having ordinary skill in the art that changes may be made in these exemplary embodiments without departing from the principles and spirit of the disclosure, the scope of which is defined in the appended claims and their equivalents.

What is claimed is:

1. A control method for a vehicle with a Dual Clutch Transmission (DCT), comprising a load applying step of applying load to an engine before the engine completely stops, from a time point at which the engine begins to stop when a vehicle enters into an Idle Stop and Go (ISG); and a declutch step of disengaging the clutch when the engine speed becomes a predetermined reference speed or less, indicating a time point immediately before the engine is stopped, wherein a clutch of the DCT is slipped in the load applying step, wherein the load applying step further comprises:
   a clutch approaching step of moving the clutch at the time point at which the engine begins to stop to a touch point where a power of the clutch starts being transmitted; and
   a slip generation step of further progressing the clutch after the clutch approaching step to generate the slip.

2. The control method for a vehicle with a DCT according to claim 1, wherein in the slip generation step, the clutch is operated linearly toward the touch point in an access direction, and in the declutch step, the clutch is operated in a disengagement direction.

* * * * *